(12) United States Patent
Onderwater

(10) Patent No.: US 11,424,043 B2
(45) Date of Patent: Aug. 23, 2022

(54) DEFECTIVE FUEL BUNDLE LOCATION SYSTEM

(71) Applicant: BWXT Nuclear Energy Canada, Inc., Peterborough (CA)

(72) Inventor: Thomas G. Onderwater, Peterborough (CA)

(73) Assignee: BWXT Nuclear Energy Canada Inc., Peterborough (CA)

(*) Notice: Subject to any disclaimer, the term of this patent is extended or adjusted under 35 U.S.C. 154(b) by 0 days.

(21) Appl. No.: 17/066,038

(22) Filed: Oct. 8, 2020

(65) Prior Publication Data
US 2021/0343433 A1 Nov. 4, 2021

Related U.S. Application Data

(60) Provisional application No. 62/914,158, filed on Oct. 11, 2019.

(51) Int. Cl.
*G21C 17/04* (2006.01)
*G21C 17/00* (2006.01)
*G21C 17/07* (2006.01)
*G21C 17/10* (2006.01)
*G21C 1/20* (2006.01)

(52) U.S. Cl.
CPC .......... *G21C 17/044* (2013.01); *G21C 17/002* (2013.01); *G21C 17/04* (2013.01); *G21C 17/042* (2013.01); *G21C 17/07* (2013.01); *G21C 17/102* (2013.01); *G21C 1/20* (2013.01)

(58) Field of Classification Search
CPC ...... G21C 17/04; G21C 17/002; G21C 17/06; G21C 17/044; G21C 17/00; G21C 17/041; G21C 17/048; G21C 17/07; G21D 3/06
USPC .......................................... 376/250, 251, 253
See application file for complete search history.

(56) References Cited

U.S. PATENT DOCUMENTS 3,110,657 A * 11/1963 Rault .................. G21C 17/102
376/247
3,178,355 A * 4/1965 Jacobs .................... F01D 9/042
376/253
3,393,125 A * 7/1968 Jackson ................ G01M 3/202
376/253

(Continued)

FOREIGN PATENT DOCUMENTS

KR 100701623 B1 * 3/2007 ............. G21C 19/19

OTHER PUBLICATIONS

International Search Report and Written Opinion, PCT/IB2020/000976, dated May 18, 2021, 7 pages.

*Primary Examiner* — Darlene M Ritchie
(74) *Attorney, Agent, or Firm* — Nelson Mullins Riley & Scarborough LLP

(57) ABSTRACT

A defective fuel bundle location system for use with a heavy water moderated nuclear fission reactor having a fueling machine, including a test tool defining an internal volume, the test tool being configured to be received within both the fueling machine and a corresponding fuel channel of the reactor, and a test container defining an internal volume, wherein the test container is configured to be received within the internal volume of the test tool and the internal volume of the test container is configured to receive primary fluid from the reactor when the test tool is disposed within the corresponding fuel channel of the reactor.

14 Claims, 11 Drawing Sheets

(56) References Cited

U.S. PATENT DOCUMENTS

| | | | | |
|---|---|---|---|---|
| 3,762,993 | A | * | 10/1973 | Jones ............... G21C 17/04 376/253 |
| 3,801,441 | A | | 4/1974 | Jones |
| 3,878,040 | A | * | 4/1975 | Martucci ............ G21C 17/04 376/253 |
| 3,940,311 | A | | 2/1976 | Frisch et al. |
| 4,650,637 | A | * | 3/1987 | Chubb ............... G21C 17/06 376/253 |
| 4,655,993 | A | * | 4/1987 | Scharpenberg ....... G21C 17/07 376/252 |
| 6,345,082 | B1 | | 2/2002 | Galioto et al. |
| 6,493,413 | B1 | * | 12/2002 | Galioto ............. G21C 17/04 376/253 |
| 2008/0130818 | A1 | * | 6/2008 | Pulmanns ........... G21C 17/04 376/253 |
| 2014/0205049 | A1 | * | 7/2014 | Zhai ............... G21C 17/002 376/251 |
| 2018/0010979 | A1 | * | 1/2018 | Hummel ............. G01M 3/205 |
| 2018/0033502 | A1 | * | 2/2018 | Hummel ............. G21C 17/06 |
| 2021/0110945 | A1 | * | 4/2021 | Burchardt ........... G21C 11/00 |
| 2021/0280329 | A1 | * | 9/2021 | Sengbusch .......... G21C 17/06 |

* cited by examiner

DEFECTIVE FUEL BUNDLE LOCATION SYSTEM

CLAIM OF PRIORITY

This application claims priority to U.S. provisional patent application No. 62/914,158 filed Oct. 11, 2019, the disclosure of which is incorporated by reference herein.

TECHNICAL FIELD

The presently-disclosed invention relates generally to systems and methods of use thereof for detecting fuel leaks in nuclear reactors and, more specifically, to systems and methods of use thereof for detecting fuel leaks in heavy water-moderated fission-type nuclear reactors.

BACKGROUND

Known systems and methods for detecting fluid leaks from failed fuel bundles in heavy water moderated nuclear fission reactors (such as a CANDU (CANada Deuterium Uranium) reactor shown in FIGS. 1A through 1C) tend to be inefficient, time consuming, and costly (for example, a few reactors have a delayed neutron system whereby each outlet endfitting has a small sample tube, all of which congregate in a sampling room where neutron detectors measure the presence of fission products from each sample tube). As shown in FIGS. 1A through 1C, in an example reactor 100, each fuel bundle is inserted into a pressure tube of a corresponding fuel channel 102 on the primary fluid side of the reactor 100 with an existing fueling machine 106 of the reactor. As shown in FIG. 1C, the fueling machine 106 includes a charge machine 108 and an accept machine 109, each of which is configured to interact with a corresponding set of fuel channel end fittings 103a and 103b, respectively, that are disposed on opposing ends of the plurality of fuel channel pressure tubes. As shown in FIG. 1C, the charge machine 108 is disposed on the upstream side of the reactor core 101 (meaning primary coolant flows through the reactor core from left to right (arrow 107)) and accesses each fuel channel pressure tube 102 by way of a corresponding fuel channel end fitting 103a, whereas the accept machine 109 is disposed on the downstream side of the reactor core 101 and accesses the desired fuel channel pressure tube 102 through the corresponding fuel channel end fitting 103b. Note, however, in other embodiments of reactors, the charge machine 108 may be disposed on the downstream side of the reactor core 101, whereas the accept machine 109 is disposed on the upstream side of the reactor core 101 (in short, the reactor may either be set up as "fuel with flow" or as "fuel against flow").

The presence of gaseous fission products in the primary fluid indicates that there are one or more failed fuel bundles. One known method of determining the location of a failed fuel bundle includes drawing primary samples from the main headers. However, there are only two headers, each one receiving flow from its designated half of the fuel channels 102. As such, the detection of gaseous fission products in one of the headers merely narrows the location of the failed bundle to any of the one-hundred and twenty-two. Note, various CANDU reactors have different numbers of fuel channels. As such, the number of fuel channels associated with each header may vary. In yet another method, the primary fluid flow is monitored for neutrons that are present when particles are leaked from a fuel bundle. In neutron monitoring systems, a bleeder line may be connected to each individual fuel channel 102 and utilized for sampling primary fluid flow out of that fuel channel 102. The water from each fuel channel 102 may be sampled via its bleed line which terminates at a detector matrix. This system is complicated based on the sheer number of fuel channels, each one having a designated bleeder line, and also very expensive (leading some reactor designs to omit the system). As well, the ability to retrofit an existing reactor with a neutron monitoring bleed line system is limited based on the excessive amount of down time that is required for its installation. Lastly, feeder scanning includes passing a detector through a network of existing feeder pipes that are collecting water exiting the fuel channel into a header manifold pipe. By correlating a position of the scanner with the feeder pipe, the source location may often be deduced. This process can also be very time consuming and can only be used when a reactor has been shut down, as in a planned outage.

Typical fuel bundles last approximately a year during normal operations. Most fuel bundle failures occur when the fuel bundles have been moved from a high radiation area within the reactor to a lower radiation area over the useful life of the fuel bundle or vice versa. The flux along the reactor channel is lower at the two ends so a shift can be into or out of the more intense central regions, also the shift in fuel in one channel will perturb adjacent channels where a developing failure may be aggravated. The changes in operating temperatures that are related to moving the fuel bundles may cause them to flex and expand, causing potential failure. As well, if the changes in temperature are not the main cause of a failure, they can be a stressor that completes an already developing crack. If the undetected leak rate becomes too high, or has persisted too long to accumulate unacceptable emissions, and cannot be located, it may be necessary to "de-rate" the reactor until the one or more failed fuel bundles can be located. As would be expected, reduced operating power limitations on the reactor lead to increased operating costs and inability to meet the desired reactor power output. Another reason for finding the bundle sooner is that extended degradation of the bundle often hides the original defect cause and prevents preventive action on fuel manufacturing or reactor operations.

There at least remains a need, therefore, for systems and methods for detecting fuel leaks in fission-type nuclear reactors in a timely manner.

SUMMARY OF INVENTION

One embodiment of the present invention provides a defective fuel bundle location system for use with a heavy water moderated nuclear fission reactor having a fueling machine, the system including a test tool defining an internal volume, the test tool being configured to be received within both the fueling machine and a corresponding fuel channel of the reactor, and a test container defining an internal volume, wherein the test container is configured to be received within the internal volume of the test tool and the internal volume of the test container is configured to receive primary fluid from the reactor when the test tool is disposed within the corresponding fuel channel of the reactor.

Another embodiment of the present invention includes a method of detecting fuel leaks in a heavy water moderated nuclear fission reactor having a plurality of fuel channels and a fueling machine, including the steps of providing a test container defining an internal volume, disposing the test container within the fueling machine, engaging the fueling machine with a corresponding one of the fuel channels, inserting the test container within the corresponding fuel channel, drawing primary fluid from the corresponding fuel channel into the internal volume of the test container, and withdrawing the test container from the fuel channel.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

Figure 1A:
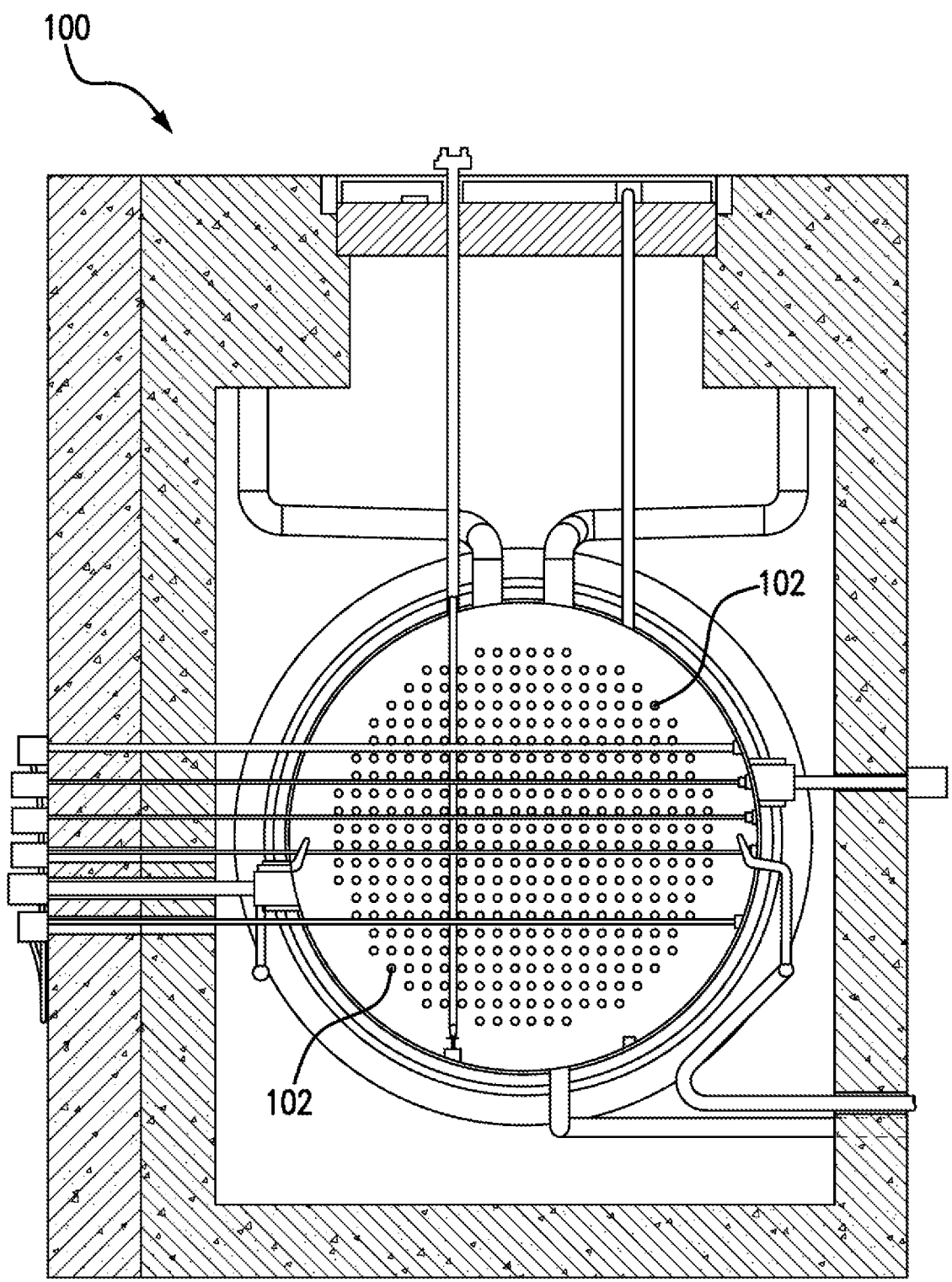
FIGS. 1A through 1C are various views of a heavy water moderated fission reactor and corresponding vessel penetrations.
Figure 1B:
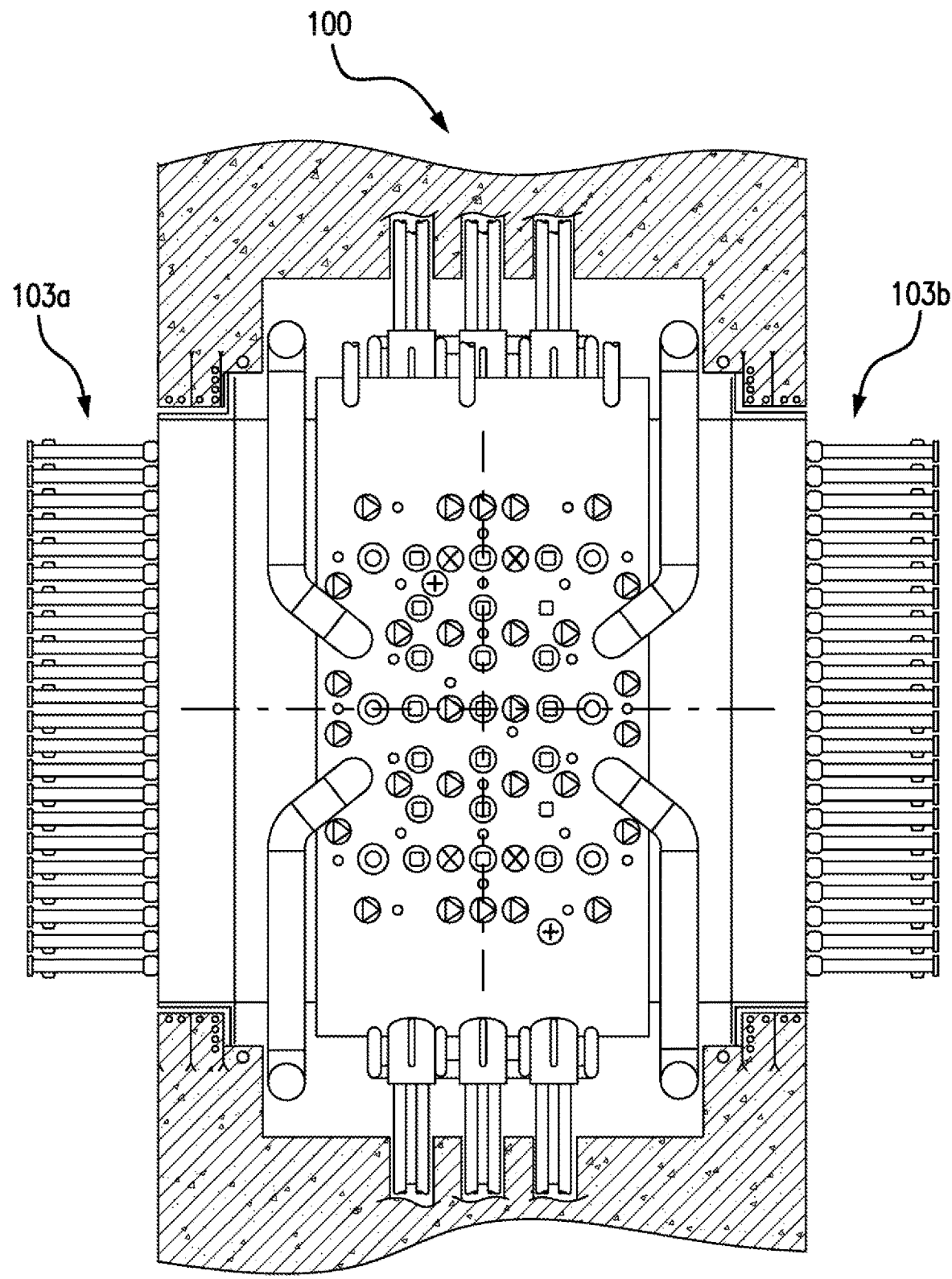
Figure 1C:
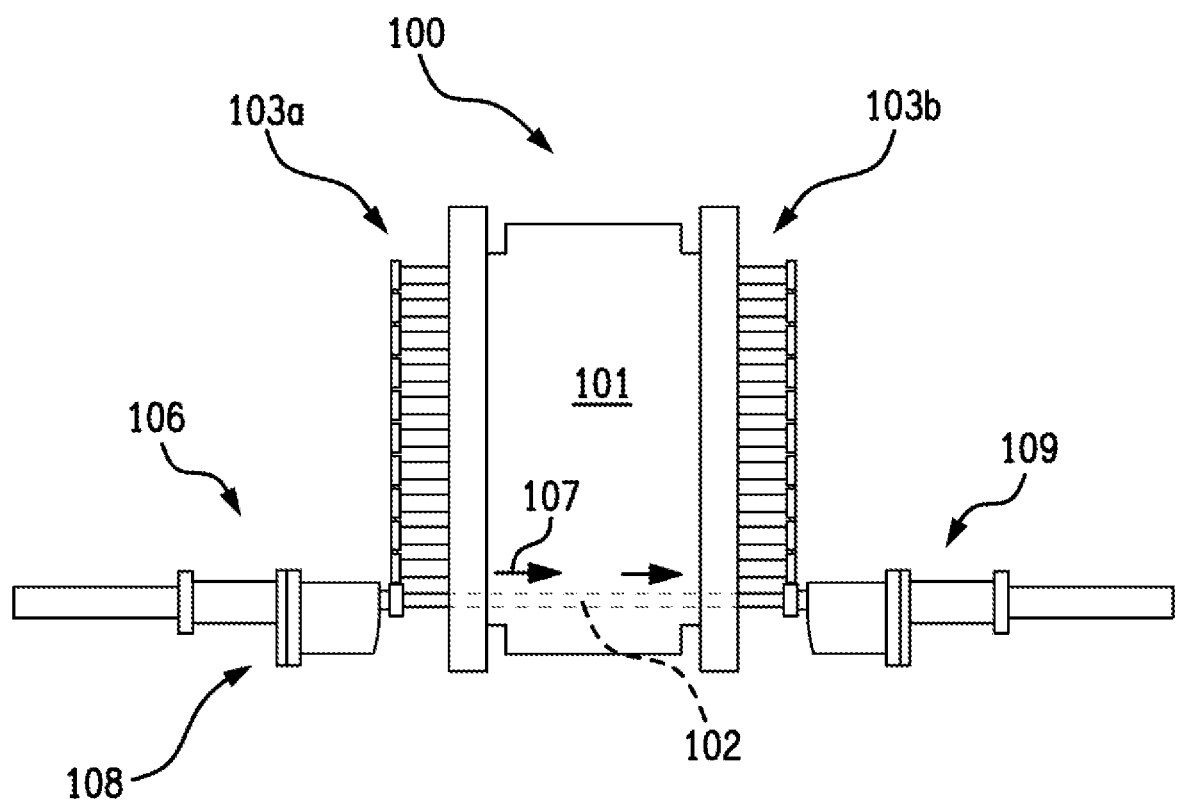

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present disclosure is related to systems and procedures to facilitate locating a fuel channel within a CANDU reactor that contains a defective fuel bundle while the reactor remains on-power, i.e., producing power under normal operating conditions, and the fuel strings are not disturbed. As well, the presently disclosed systems and procedures may also be utilized when a reactor has been shut down or during an outage.

Figure 2:
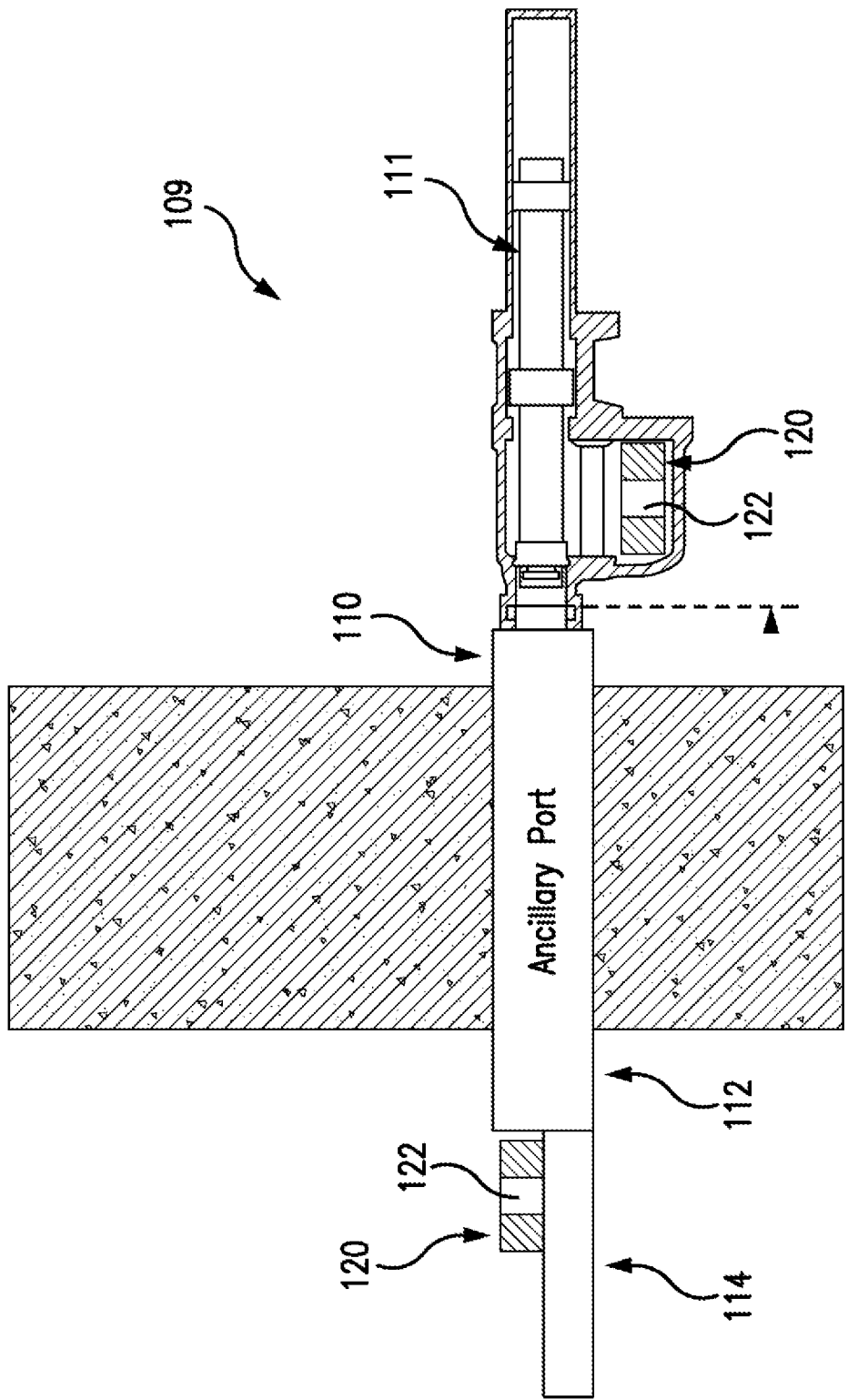
FIG. 2 is a schematic view of a charge machine of the reactor shown in FIGS. 1A-1C, receiving a testing tool therein through an access port such as an ancillary or maintenance port of the maintenance or fuel bundle handling area, in accordance with an embodiment of the present disclosure.

Referring now to FIG. 2, to initiate sampling of the primary fluid, the accept machine 109 of the reactor's fueling machine 106 is positioned at the reactor's ancillary port 110 and locked on. As previously noted, whether the reactor is "fuel with flow" or "fuel against flow" will determine whether the accept machine or the charge machine is on the downstream side of the reactor 101. The ancillary port fuel carrier 112 is installed as well as the shield plug trough 114. After ensuring that an empty magazine position is available in the charge machine 108, the ancillary port shield plug is removed. Next, a test tool 120, which is preferably sized similarly to a regular fuel bundle, including a test container 122 disposed therein, is placed on the trough 114 while ensuring that the test tool 120 is properly orientated. Preferably, the ram of the charge machine 108 is used to activate the test container 122 once the test container 122 is in the desired fuel channel, as discussed in greater detail below, meaning that the desired end of the test tool 120 must be positioned adjacent the ram 111 so it can make contact with the ram 111 for activation when desired. Next, the charge tube/ram 111 of the charge machine 108 is engaged and locked onto the test tool 120. The charge tube/ram 111 of the charge machine 108 is withdrawn so that the test tool 120 will be stored in an empty position of the charge machine's magazine. The charge tube/ram 111 releases the test tool in the magazine, retracts further and allows the magazine to rotate to the next empty position. In the present example, up to eight test tools 120 may be loaded into the magazine of the charge machine 108 dependent upon the number of fuel channel samples that are to be taken. Note, however, in other embodiments the magazine may contain fewer or more than eight test tools. After the ancillary port shield plug is replaced and the charge machine 108 is disengaged, the charge machine 108 is moved to the desired fuel channel 102 to be tested.

Figure 3A:
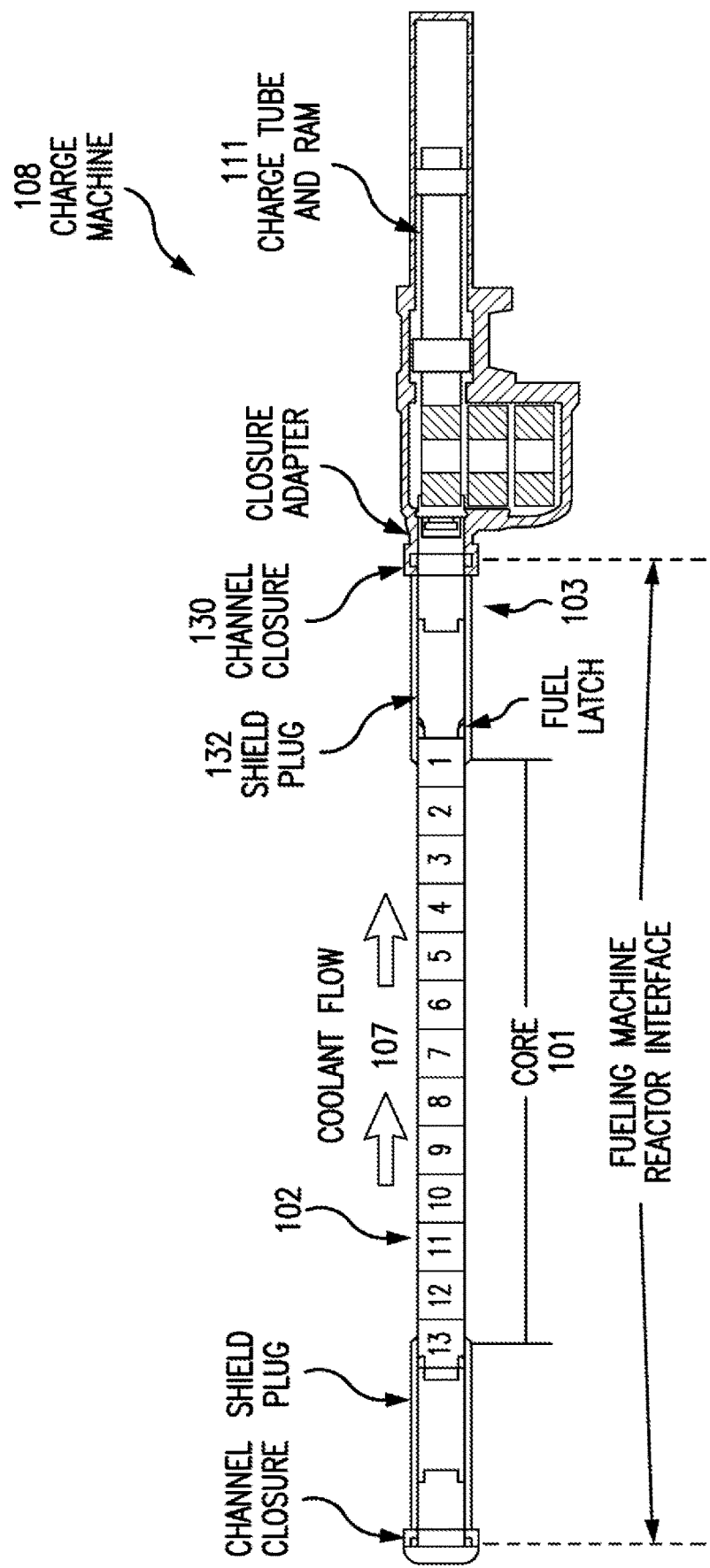
FIGS. 3A through 3E are schematic views of the testing tool shown in FIG. 2 being inserted into the downstream end of a corresponding fuel channel of the reactor for sampling the primary coolant flowing therethrough.
Figure 3B:
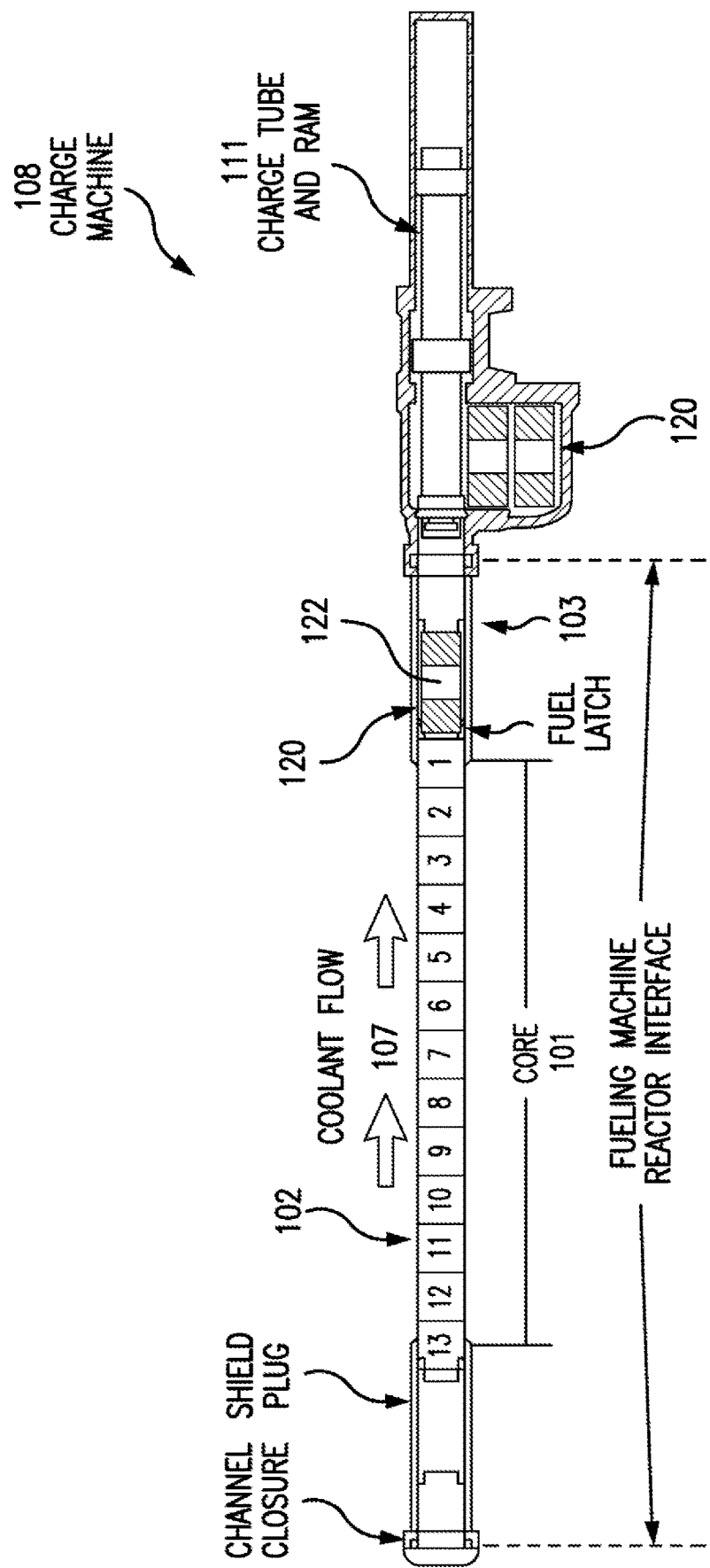
Figure 3C:
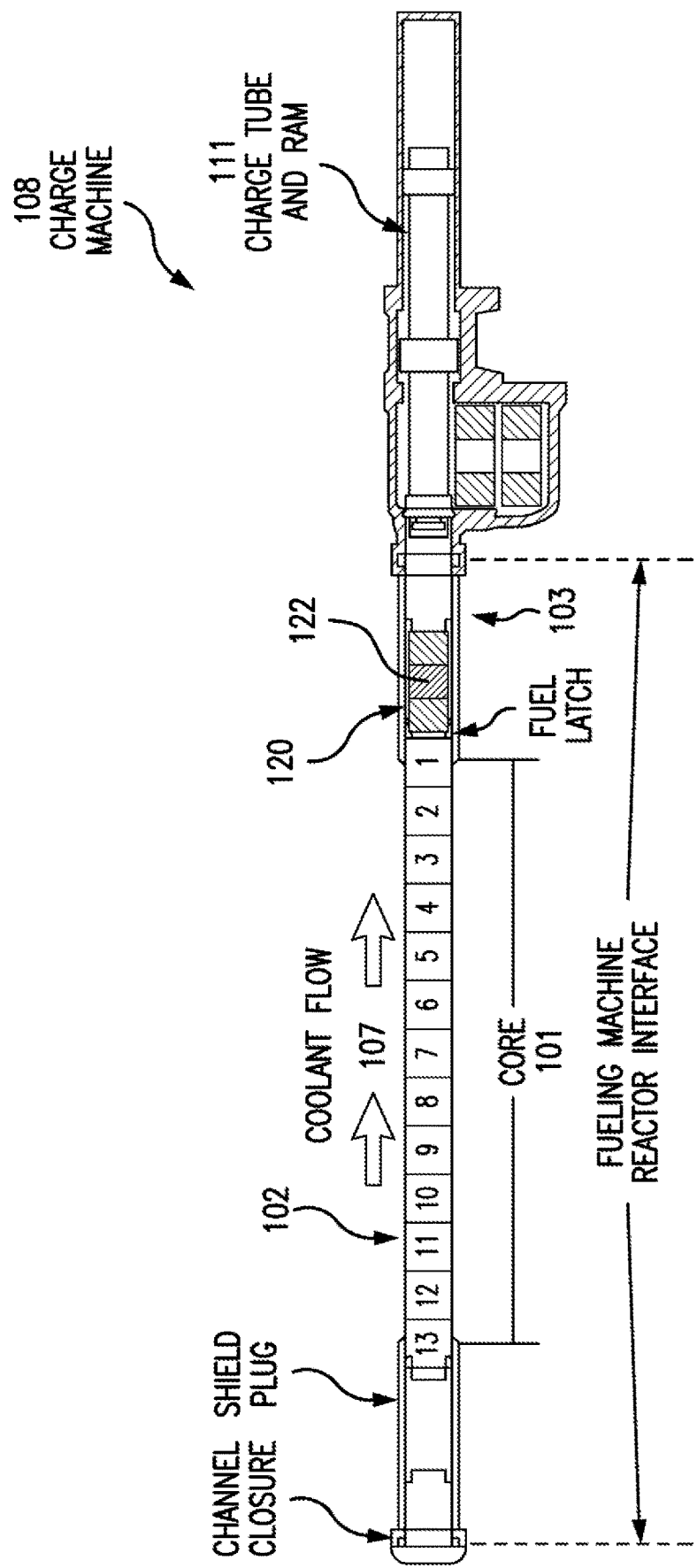
Figure 3D:
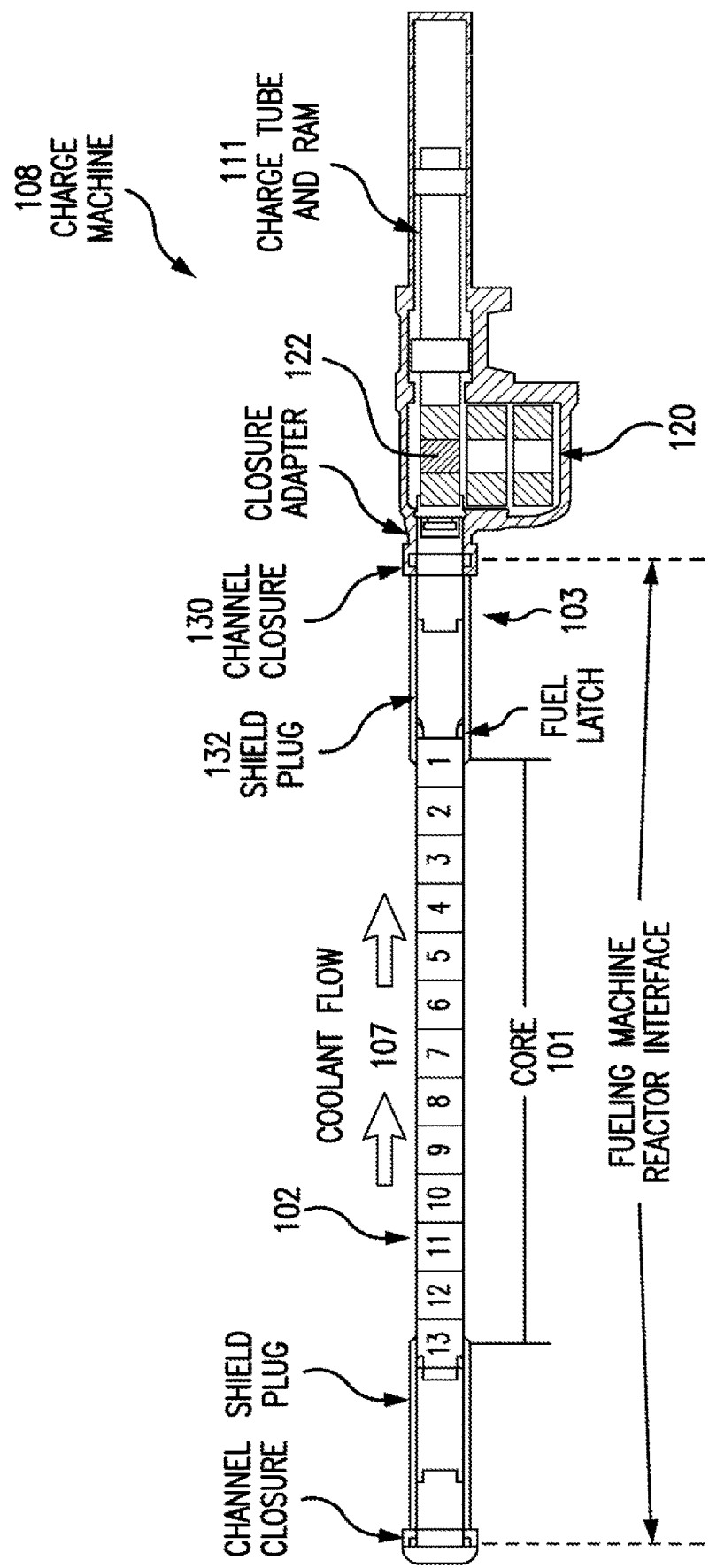
Figure 3E:
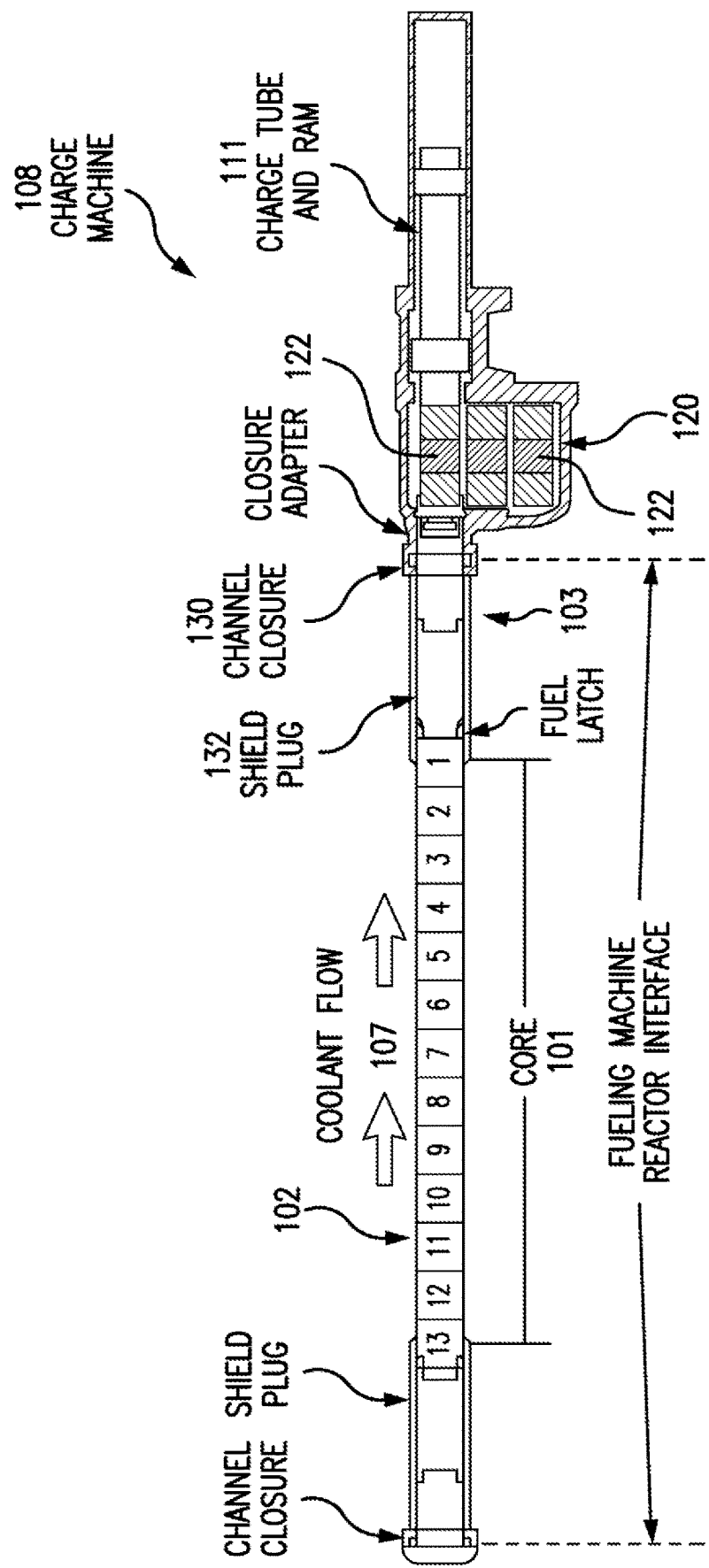

Referring now to FIGS. 3A through 3E, the charge machine 108 is positioned adjacent the target fuel channel 102 and locked onto the corresponding fuel channel end fitting 103 (FIG. 3A). After the fuel channel closure 130 and the shield plug 132 are removed and stored in magazine locations, the magazine rotates to a test tool location, the charge tube/ram 111 is engaged with the test tool 120 and the test tool 120 is installed into the fuel channel 102 in the same manner as a fuel bundle carrier would be (FIG. 3B). Next, the charge tube/ram 111 of the charge machine 108 is utilized to activate the test container 122 in order to obtain the sample of primary fluid from the target fluid channel 102 (FIG. 3C). The ingestion of primary fluid commences only after activation by relative movement of the ram and or charge tube. Primary liquid then enters until the interior volume equalizes with the fuel channel pressure. The lower pressure can be a pre-pressurized gas, atmospheric air or a vacuum. Once equalized with the fuel channel, release or relative movement of the charge tube/ram 111 returns the test container 122 to the sealed configuration. The test container 122 sample volume can be provided by a means of increasing the internal volume, e.g., a contracted or squeezed bellows/accordion can be released to or made to expand when in channel conditions by relative movements of the charge tube/ram 111 or by their action releasing a trigger. The test container 122 sample volume can be: increased by the charge tube/ram 111 action releasing a trigger of a sprung piston causing an retraction of the piston and ingestion of water; provided by a means of positive displacement wherein the charge tube/ram 111 movement grips a piston extension and draws water into a syringe type canister; and a porous media that once a valve is opened or membrane perforated, liquid would be wicked/absorbed. The test container 122 is also preferably self-sealing after obtaining the primary fluid sample. With the sample obtained, the charge tube/ram 111 of the charge machine 108 are retracted so that the test tool 120 and corresponding test container 122 are stored in the desired position within the magazine of the charge machine 108 (FIG. 3D). After installation of the shield plug 132 and channel closure 130, the charge machine 108 is undocked from the fuel channel outlet end fitting 103. The above steps are repeated at each target fuel channel 102 until the desired number of primary fluid samples are obtained, the magazine of the charge machine 108 being able to hold up to eight test tools 120 and their corresponding test containers 122 (FIG. 3E).

Figure 4:
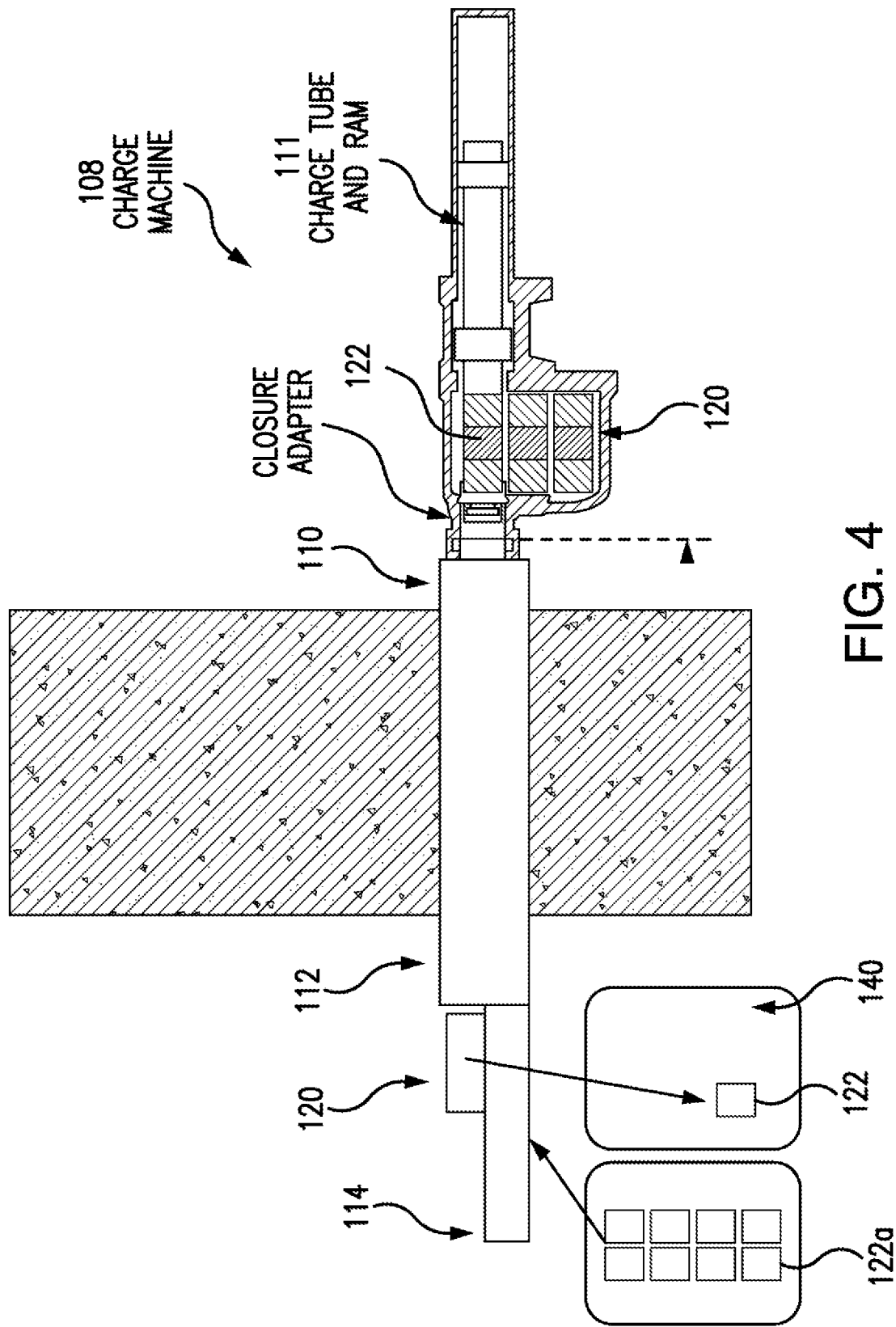
FIG. 4 is a schematic view of the charge (or accept machine from the downstream end fitting) machine unloading an activated test tool at the ancillary port of the reactor for transfer to a testing area.
Figure 5:
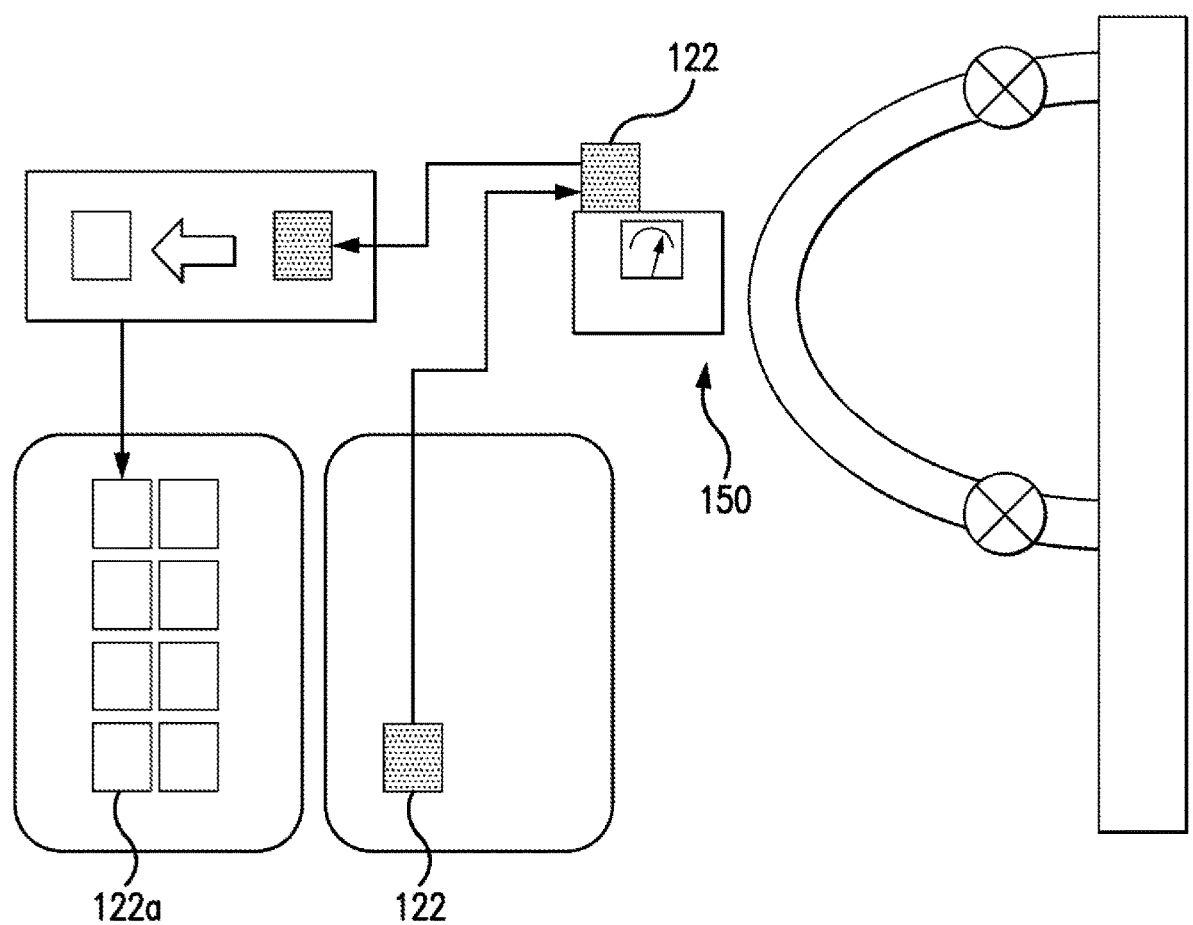
FIG. 5 is a schematic view of activated test tools being monitored for potentially contaminated primary fluid.

Referring now to FIG. 4, after the desired number of primary fluid samples have been taken, the charge machine 108 is returned to the ancillary port 110 and locked on to the port. As before, the ancillary port fuel carrier 112 is installed along with the shield plug trough 114 prior to removing the ancillary port shield plug. The tool carriers 120 are advanced onto the trough 114 in the same manner that ancillary tooling would be retrieved. Next, each test container 122 is removed from the corresponding test tool 120 until each previously activated test container 122 has been unloaded. If additional samples are to be taken, non-activated, empty test containers 122a may be loaded into the test tools 120 and loaded into the charge machine 108 as previously discussed. Once the unloading operation is complete, the ancillary port shield plug is installed and the ancillary port trough 114 removed. Lastly, the charge machine 108 is disengaged from the ancillary port 110 and may continue with further testing for fueling procedures as desired. After being removed from the corresponding test tools 120, the activated test container 122 are placed into a transport case 140 for transfer to an analysis facility. As shown in FIG. 5, the primary fluid samples within the activated test containers 122 are moved to a lab for analysis by a detection device 150. Note, the primary samples may be analyzed at both on and off-site facilities. For example, if measurement equipment allows, the sample could be analyzed close to the port. After analysis, the test containers 122 may be emptied and readied for future use.

The above described fuel leak detection system and methods offer various advantages over known testing systems and methodologies. For example, the first results of fluid testing may be obtained within 4 to 6 hours of the beginning of the operation, and up to 16 fuel channels may be tested in one fuel machine trip. The described method is non-disruptive in that it may be utilized when the reactor is online at full power, with no piping modifications, and no modifications to the present CANDU fueling machines. The ability to determine the location of leaks faster than previous methods allows for maximum operation of the reactor and provides less risk of reactor power production de-rating, or outages. Early detection of defective fuel bundles also allows the potential cause of the fuel leak to be more discernable as less corrosion will have taken place over the life of the fuel leak. The present system causes no fuel physics perturbations in that the fuel bundles within the fuel channels are not manipulated during the testing process and premature fueling (new in/not-fully utilized out) has not been performed as a means to cause deductive shifts in detection from the feeder header monitor style. A current method uses deductive logic reviewing the change in leak rate indications after selective shifts in fuel to change the fuel bundle temperatures in that vicinity via moving a one channel's bundles to different flux/temperature positions. A leaking bundle in the vicinity of the shift will raise or lower its emission of leaking fission products. Multiple pushes are usually required to deduce which channel contains the leak. One channel or a zone of channels cannot be 'over-fueled' in a short period of time as the accumulation of fresh fuel in one area will create excessive power in surrounding channels or reactor zones. This method often must be done in batches separated by sufficient time for new bundles to decay; a major reason this method protracts the residence time of the bundle, increases the released emissions, risks defect aggravation and risks reactor de-rating. Notably, because the above described system includes test tools and test containers that are integrated with existing CANDU fueling machines and systems, the described system is transferable to any CANDU reactor site without requiring modifications thereto.

While one or more preferred embodiments of the invention are described above, it should be appreciated by those skilled in the art that various modifications and variations can be made in the present invention without departing from the scope and spirit thereof. For example, at some reactors, the ancillary port is a preferred embodiment, or a tool path entering through the new fuel machine/port and exiting through the spent fuel port may be utilized. The spent fuel port in the spent fuel bay could be a means to retrieve the canisters and keep them shielded until flasked for transport. At some reactors, a fueling machine tooling or maintenance port could be used as the ancillary port is described. Alternatively the new fuel port and spent fuel tunnel path could be used to retrieve the canisters and tool from the spent fuel bay. Once the canister is retrieved, the preferred embodiment would be to flask the canister and move it to an existing neutron detector. Alternatively a local detector could be made available at/on the ancillary port or near the spent fuel bay to avoid shipping. The resetting of a tool with empty canister could be performed by replacing the canister in a tool that is presented and returned to the FM. It could be done by ensuring a stock pile of refurbished tool and canister are on hand. With refurbishment and return to stores locally or offsite. Measured canisters would have their contents returned to a heavy water recovery/cleansing path existing at site or provided offsite. It is intended that the present invention cover such modifications and variations as come within the scope and spirit of the appended claims and their equivalents.

The invention claimed is:

1. A defective fuel bundle location system for use with a heavy water moderated nuclear fission reactor having a fueling machine, comprising: a test tool defining an internal volume, the test tool being configured to be received entirely within both the fueling machine and a corresponding fuel channel of the reactor; and a test container defining an internal volume, wherein the test container is configured to be received within the internal volume of the test tool and the internal volume of the test container is configured to receive primary fluid from the reactor when the test tool is disposed within the corresponding fuel channel of the reactor, wherein the fueling machine further comprises a ram configured to activate the test container so that primary fluid is received in the internal volume of the test container.

2. The system of claim 1, wherein the test container is configured to draw the primary fluid into the internal volume of the test container by way of the interior volume of the test container being initially at a lower pressure than a pressure of the primary fluid.

3. The system of claim 1, wherein the fueling machine comprises both an accept machine and a charge machine.

4. The system of claim 1, wherein the ram of the fueling machine is configured to both insert and withdraw the test tool from the corresponding fuel channel of the reactor.

5. The system of claim 4, wherein the test container further comprises one of a bellows and a piston configured to draw primary coolant into the internal volume of the test container.

6. A defective fuel bundle location system for use with a heavy water moderated nuclear fission reactor, comprising:
   a fueling machine including a charge machine with a ram;
   a test tool defining an internal volume, the test tool being configured to be received within both the charge machine of the fueling machine and a corresponding fuel channel of the reactor; and
   a test container defining an internal volume, wherein the test container is configured to be received within the internal volume of the test tool and the internal volume of the test container is configured to receive primary fluid from the reactor when the test tool is disposed within the corresponding fuel channel of the reactor,
   wherein the ram is configured to activate the test container so that primary fluid is received in the internal volume of the test container.

7. The system of claim 6, wherein the fueling machine further comprises an accept machine.

8. The system of claim 6, wherein the test container is configured to draw primary fluid into the internal volume of the test container by way of the interior volume of the test container being initially at a lower pressure than a pressure of the primary fluid.

9. The system of claim 6, wherein the ram of the fueling machine is configured to both insert and withdraw the test tool from the corresponding fuel channel of the reactor.

10. The system of claim 9, wherein the test container further comprises one of a bellows and a piston configured to draw primary coolant into the internal volume of the test container.

11. A defective fuel bundle location system for use with a heavy water moderated nuclear fission reactor, comprising:
    a test tool defining an internal volume, the test tool being configured to be received within both the fueling machine and a corresponding fuel channel of the reactor; and
    a test container defining an internal volume, the test container being configured to be received within the internal volume of the test tool and the internal volume of the test container is configured to receive primary fluid from the reactor when the test tool is disposed within the corresponding fuel channel of the reactor,
    wherein the test container further comprises one of a bellows and a piston configured to draw primary coolant into the internal volume of the test container.

12. The system of claim 11, wherein the test container is configured to draw primary fluid into the internal volume of the test container by way of the interior volume of the test container being initially at a lower pressure than a pressure of the primary fluid.

13. The system of claim 12, wherein the fueling machine further comprises a ram configured to activate the test container so that primary fluid is received in the internal volume of the test container.

14. The system of claim 13, wherein the ram of the fueling machine is configured to both insert and withdraw the test tool from the corresponding fuel channel of the reactor.

* * * * *